United States Patent [19]

Wirsching et al.

[11] 4,423,016
[45] Dec. 27, 1983

[54] PROCESS FOR THE PRODUCTION OF DRY FLUE GAS GYPSUM

[76] Inventors: Franz Wirsching, In den Weinbergen 7; Rolf Hüller, Neubergstrasse 37, both of 8715 Iphofen; Bärbel Limmer, Virchowstr. 39, 8500 Nürnberg, all of Fed. Rep. of Germany

[21] Appl. No.: 353,738

[22] Filed: Mar. 1, 1982

[30] Foreign Application Priority Data

Mar. 3, 1981 [DE] Fed. Rep. of Germany ....... 3107951

[51] Int. Cl.$^3$ ............................ C01F 1/00; C01F 5/12; C22B 26/20; C01B 17/00
[52] U.S. Cl. .................................... 423/170; 423/166; 423/242; 423/555; 159/16 R
[58] Field of Search ............... 423/242 A, 242 R, 555, 423/170, 166, 178; 159/16 R

[56] References Cited

U.S. PATENT DOCUMENTS 3,980,756  9/1976  Dixson et al. .................. 423/242
4,207,290  6/1980  Lee .................................. 423/242
4,355,013 10/1982  Bechthold et al. ............. 423/242

FOREIGN PATENT DOCUMENTS 2727544  4/1979  Fed. Rep. of Germany .

*Primary Examiner*—Gregory A. Heller
*Attorney, Agent, or Firm*—Millen & White

[57] ABSTRACT

A process for producing dry flue gas gypsum substantially free of hemihydrate and anhydrous calcium sulfate comprises drying wet flue gas gypsum, typically having a free water content of about 4–12% by weight, in direct contact with a partial stream withdrawn from a primary stream of a dry dedusted flue gas. Flue gas gypsum produced in a wet desulfuration stage is fed to contact the partial stream and is separated from this partial stream and removed as dried flue gas gypsum. Remaining superfine flue gas gypsum is then fed to the intake side, or to the delivery side of a booster blower arranged upstream of the flue gas desulfuration device along with the partial flue gas stream discharged from the drying stage, and the superfine particulate flue gas gypsum is conducted from the booster blower into the flue gas desulfurizing device to serve as seed crystals for additional production of gypsum therein.

14 Claims, 1 Drawing Figure

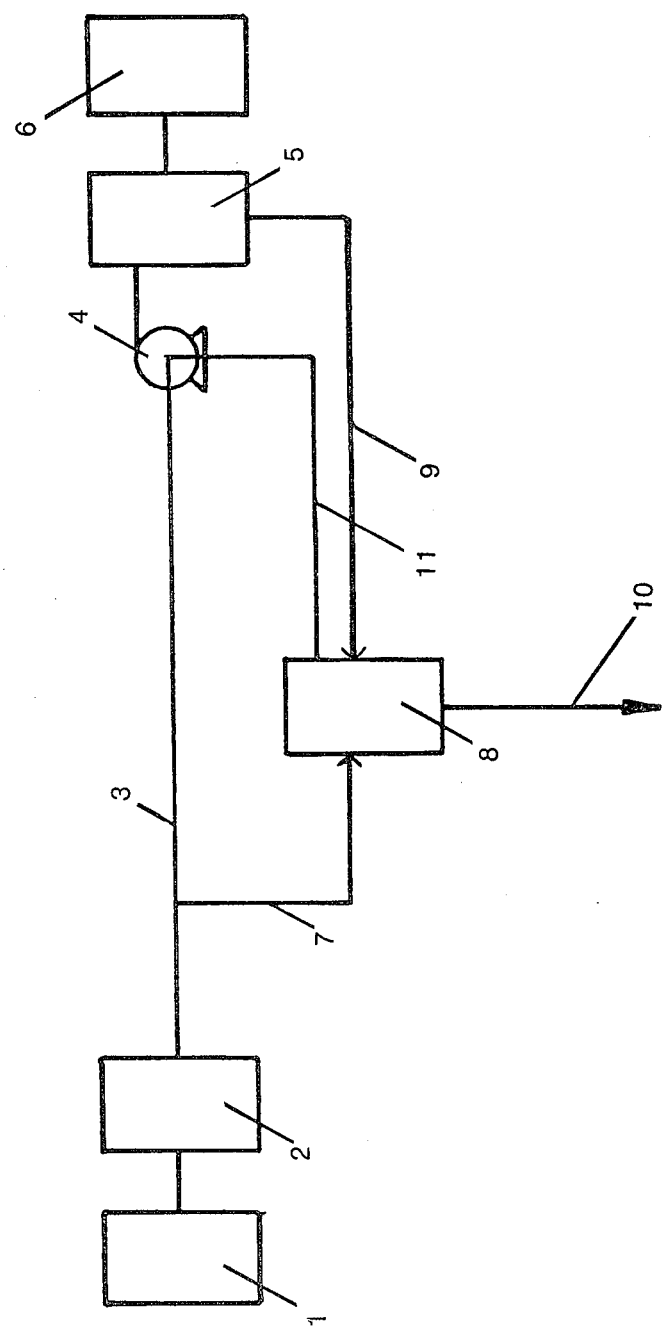

PROCESS FOR THE PRODUCTION OF DRY FLUE GAS GYPSUM

BACKGROUND OF THE INVENTION

This invention relates to a process for driving out or removing free water from flue gas gypsum. Flue gas gypsum is calcium sulfate in substantially dihydrate form ($CaSO_4 \cdot 2H_2O$). Hereinafter, dry flue gas gypsum, means $CaSO_4 \cdot 2H_2O$ without free water associated therewith.

One prior art process for driving out water from flue gas gypsum is discussed in DOS No. 2,727,544, according to which a flue gas stream discharged from a dust extractor is fed in its entirety to a fluidized-bed dryer as both the drying and carrier gas. In the fluidized-bed dryer, the flue gas stream forms a fluidized layer together with the flue gas gypsum introduced into the dryer. The gas and flue gas gypsum mixture is then discharged from the fluidized-bed dryer and is separated in a dust precipitator connected downstream thereof. As a result of this process, the flue gas gypsum is dewatered to the hemihydrate ($2CaSO_4 \cdot H_2O$), and discharged from the dust precipitator as the product, while the dust-free flue gas, cooled to a temperature of about 100° C., is introduced into a wet desulfuration device.

In accordance with this prior-art process, the flue gases are fed into the fluidized-dryer at a temperature of 150°–200° C., and are removed therefrom at a temperature of about 100° C. As a consequence, the flue gas gypsum is heated in the fluidized bed to a temperature of 130°–150° C. However, as is already known, in this process, the anhydrite ($CaSO_4$) is also formed at this temperature from the flue gas gypsum, i.e., the dihydrate ($CaSO_4 \cdot 2H_2O$), in addition to the flue gas gypsum hemihydrate. Thus, the presence or formation of anhydrite results in a nonuniform product being obtained. Furthermore, there is also the danger in the conventional process, due to the cooling of the entire flue gas stream to a temperature of about 100° C., that the temperature will fall below the acid dew point temperature in the flue gas, at least on the way from the dryer to the wet desulfuration installation, resulting in corrosion damage occurring on all units with which the flue gas comes in contact. This effect can only be avoided by heating the flue gas stream withdrawn from the dryer to a temperature of at least 120° C. by supplying heat from an external source.

Various other possibilities have been considered for drying out free water from flue gas gypsum by utilizing the heat contained in dedusted flue gases without requiring an external energy source.

SUMMARY OF THE INVENTION

In accordance with the invention, a process has been developed for producing dry flue gas gypsum consisting essentially of finely divided calcium sulfate dihydrate and substantially free of hemihydrate and anhydrous calcium sulfate, by fluidizing and dewatering flue gas gypsum containing free water in a dry-dedusted flue gas stream. By the term dedusted is meant screening, removing dust or other fine impurities. The dry-dedusted flue gas stream is later fed to a wet desulfuration stage after separation of the product, i.e., dry flue gas gypsum, from a drying step. According to the process, wet flue gas gypsum, containing free water, is suspended in a fluidized bed in a partial stream comprising 1–10% by volume, of the total volume of the dedusted flue gas stream. More specifically, the flue gas gypsum containing partial stream is withdrawn downstream of a dedusting unit, and on the intake side of a booster blower connected upstream of a wet desulfuration device, from the primary stream of the flue gas at a temperature of 90 ®–130° C., and is left in this suspended bed until the free water content in the flue gas gypsum is reduced to practically zero. The dry, finely divided flue gas gypsum is then separated in a cyclone separator as the product from the gaseous stream withdrawn from the fluidized bed, and is discharged. The gaseous stream from which the dry flue gas gypsum is separated, which is still loaded with superfine flue gas gypsum dust, is recycled to the intake side or to the delivery side of the booster blower connected upstream of the wet desulfuration device, and is combined therein with the primary stream of the flue gas.

In order to conduct the process of the invention, a partial stream is removed from the main flue gas stream after dedusting for example, in a conventional electrostatic filter which is located in its flowpath to the intake side of a booster blower usually connected upstream of a wet desulfuration device. This partial stream typically comprises 1–10% by volume, based on the total volume of the flue gas stream. The partial stream can be withdrawn from the primary stream of the flue gas immediately after the dedusting device, for example, after the electrostatic filtering means. However, it has also proven advantageous to take the partial stream from the flue gas stream on the delivery side of the dedusting device connected upstream of the booster blower. Normally, the flue gases discharged from a dry purification unit are obtained from furnace installations, especially from a furnace installation such as coal-fed power plant block. The flue gases are obtained at a temperature of about 90°–130° C., and can be used in this state directly and without requiring additional heating in order to conduct the process of the invention.

In this application, the partial stream of flue gases is fed by means of a suction from the bottom of the furnace, into a conventional dryer, for example through a pipe nipple or a screen plate. The dryer is fed with the flue gas gypsum to be dried which is separated from the main flue gas stream in a desulfuration device, from the top in a manner such that there is a uniform distribution of the wet flue gas gypsum in the partial flue gas stream.

The introduction of the flue gas gypsum to be dried from the desulfuration device into the dryer is effected by means of a conventional feeding element, such as, for example, a double pendulum flap or a rotary blade gate valve.

The flue gas gypsum finally obtained from the desulfuration device typically has a free water content of about 4–12% by weight, usually 6% to 10% by weight. The final product of the flue gas gypsum is obtained as a result of a flue gas desulfuration in a furnace installation which is typically operated according to the wet method with alkaline-acting calcium compounds or especially, with calcium carbonate. The conventional commercial process is disclosed VDI-Bericht 267, Technische Verfahren zur Entschwefelung von Abgasen und Brennstoffen, Düsseldorf 1976.

Advantageously, a device such as a rotating shaft or a revolving plate can be provided in the dryer to achieve a maximum uniform distribution of the introduced flue gas gypsum into the partial stream of the flue gas which is drawn through the dryer and which already contains a portion of the gypsum distributed therethrough. As a result of the intense intermixing of the flue gas with the finely divided flue gas gypsum in the suspended bed formed in the dryer, the free water is vaporized from the flue gas gypsum without the latter losing any of water of crystallization, i.e., $CaSO_4.2H_2O$ remains. During this step, the flue gas is cooled to a temperature of about 40°–70° C. The specific quantity of flue gas required for drying the flue gas gypsum to a free water content of practically 0% by weight, is from 2,500 to 12,000 $m^3/t$ of dry flue gas gypsum.

The flue gas gypsum, dried in this way to a free water content of about 0% by weight, and preferably no more than 1%, is discharged with the partial stream of the flue gas from the dryer and fed into a cyclone separator wherein the major portion, i.e., from 90 to 99% by weight of the finely divided flue gas gypsum is separated from the gaseous stream and removed as the product. Only the dust-like superfine proportion, i.e., from 1 to 10% by weight of the flue gas gypsum still remains in the gaseous steam withdrawn from the cyclone and is introduced together with the partial stream of the flue gas into the intake side or the delivery side of the booster blower. The particle size of the finely divided flue gas gypsum lies above 20 microns, the particle size of the dust-like superfine flue gas gypsum lies below 20 microns.

In the booster blower the superfine flue gas gypsum is recombined with the primary stream of the flue gas. The dust-like particles of the superfine flue gas gypsum serve as seed crystals or crystallization nuclei for the new formation of flue gas gypsum in the flue gas desulfuration operated according to the wet method.

The process of the invention makes it possible to conduct the partial stream of the flue gas after separation of the dry flue gas gypsum in a conduit in indirect, intimate contact with the uncooled primary stream of the flue gas. This contact can be accomplished either by (1) arranging the gas line leading from the cyclone separator in direct contact with the gas line through which the primary gaseous stream of the flue gas is conducted, or (2) by surrounding the line from the cyclone separator with a jacket through which a further partial stream of the flue gas is conveyed by suction. Either arrangement is effective for raising the temperature of the cooled-off partial stream of the flue gas to a temperature of 100°–130° C. and thus, avoids condensation of acid on the inner walls of the conduits.

The flue gas gypsum discharged from the cyclone separator as a product typically contains, in accordance with its degree of purity, its entire water of crystallization up to a maximum of about 20.9% by weight, and substantially no free water, i.e., less than 1% by weight. This product contains no calciumsulfatehemihydrate or anhydrite.

The elements used in conducting the process of the invention are all conventional in nature and well known to those skilled in the art.

BRIEF DESCRIPTION OF THE DRAWING

Various other objects, features and attendant advantages of the present invention will be more fully appreciated as the same becomes better understood when considered in conjunction with the accompanying drawing, in which like reference characters designate the same or similar parts throughout the one view, and wherein:

The FIGURE is a schematic diagram illustrating the arrangement of elements employed for conducting the process of the invention.

DETAILED DISCUSSION

The flow chart of the process of this invention is illustrated in the drawing. In the drawing, the flue gas stream is produced in the coal-burning installation 1 of a power plant and is then passed for dedusting purposes through an electrostatic filtering unit 2. Subsequently, the primary stream of the now dedusted flue gas is conducted through conduit 3 to the intake side of the booster blower 4 which is connected upstream of the internal flue gas desulfuration device 5. The booster blower 4 then feeds the desulfuration device 5 which discharges the desulfurized flue gases at the flue 6.

A partial flue gas stream is withdrawn from conduit 3 through conduit 7, and fed to the dryer 8 having a cyclone separator operatively associated therewith, and which is connected downstream from conduit 3 on conduit 7. Additionally, the major portion of the flue gas gypsum to be dried which is separated from the major stream of flue gas is removed from the desulfuration device 5 and is also introduced into the dryer 8 and cyclone separator through conduit 9. This flue gas gypsum was previously separated from the flue gas in the flue gas desulfuration device 5, and removed as a product and contains free water. The flue gas gypsum is dried, and is substantially free of hemihydrate and anhydrous calcium sulfate. This dry flue gas gypsum is then removed from the cyclone separator of the dryer 8 through conduit 10, and a gaseous stream is discharged from the cyclone separator of the dryer 8 and is fed through conduit 11 to the intake side, i.e., delivery side, of the booster blower 4.

In accordance with the invention, the process can be conducted without requiring large amounts of energy. More specifically, process uses the same amount of energy as is required anyway for conducting the flue gas desulfuration process according to the wet method, which requires the raising of the pressure of the flue gas to be introduced into the desulfuration device. Furthermore, it is also unnecessary according to the process of the invention to clean the partial stream of the flue gas, separated from the dry flue gas gypsum, until it is free of dust because these flue gas gypsum dust particles which are entrained into the desulfuration device according to the wet method are useful for conducting the process in this device.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1 (The Invention)

A flue gas gypsum having 20.7% by weight of water of crystallization, and a free water content of 9.0% by weight, is discharged as the product from a process in a gas desulfuration device conducted according to the wet method. This wet flue gas gypsum is fed through a double pendulum flap to the interior of a fluidized bed dryer and is uniformly distributed therein in a suspended bed by means of a revolving plate in a partial flue gas stream. The partial flue gas stream is separated from a primary stream, and discharged at a temperature of 130° C. from a total primary stream volume of 200,000 m³/h, also at 130° C., which is withdrawn from a dry dedusting step executed with electrostatic filters. The volume of the partial gas stream is 5,000 m³/h, or 2.5% by volume based on the volume of the primary gas stream. The dried flue gas gypsum leaves the dryer together with the partial flue gas stream, which has a temperature of 70° C. at the dryer outlet, and is separated in a cyclone separator connected downstream therefrom. More specifically, the majority of the flue gas gypsum is separated in its main quantity from the partial flue gas stream, and the flue gas stream is then fed to the intake side of the booster blower through a conduit laid alongside, and in close contact with the conduit for the primary gas stream. The superfine flue gas gypsum from the dryer is then introduced into the flue gas desulfuration device. The operating data and operating results are indicated in column 1 of the table set forth hereinafter.

EXAMPLE 2 (Comparison)

A flue gas gypsum is dried, following the mode of operation disclosed in Example 1, but using in place of the partial flue gas stream, an air stream which is heated to a temperature of 130° C. with an outside separate energy source, and is fed into the fluidized bed dryer by means of a fan. The operating data and operating results are set forth in column 2 of the table.

EXAMPLE 3 (Comparison)

According to the mode of operation indicated in Examples 1 and 2, the flue gas gypsum is dried, but with the use of an air stream heated with a separate energy source, and utilizing a fluidized-bed type dryer as the drying means. The operating data and operating results are set forth in column 3 of the table.

EXAMPLE 4 (Invention)

A flue gas gypsum withdrawn as the product from a process in a flue gas desulfuration device conducted according to the wet method, having 18.8% by weight of water of crystallization and a free water content of 10.0% by weight, is fed through a double pendulum flap to the interior of a quick-action dryer, and is therein uniformly distributed, by means of revolving shafts, in a partial flue gas stream withdrawn from a primary stream which is at a temperature of 130° C. and at a volume flow rate of 2,260,000 m³/h from a dry dedusting step effected by means of electrostatic filters. The partial stream withdrawn is at a volume rate of 203,000 m³/h, or 9.0% by volume, based on the volume of the primary gas stream. The dried flue gas gypsum leaves the dryer together with the partial flue gas stream, which has a temperature of 50° C. at the dryer outlet, and is separated in its main quantity from the partial flue gas stream in a cyclone separator connected downstream therefrom. The partial flue gas stream is then fed to the delivery side of the booster blower through a conduit laid alongside and in close contact with the conduit for the primary gas stream. The superfine flue gas gypsum from the dryer is introduced into the flue gas desulfuration device. The operating data and operating results are indicated in column 4 of the table.

TABLE

| | Column 1 Utilization of Flue Gas Heat and Booster Blower (Invention) | Column 2 External Energy (Comparison) | Column 3 Fluidized Bed Dryer (Comparison) | Column 4 Utilization of Flue Gas Heat (Invention) |
|---|---|---|---|---|
| Operating Temperatures | | | | |
| Flue gas inlet temperature °C. | 130 | 130 | 160 | 130 |
| Flue gas outlet temperature °C. | 70 | 70 | 100 | 50 |
| Flue gas gypsum temperature °C. | 70 | 70 | 95 | 50 |
| Partial Stream Flue Gas Amount | | | | |
| vol-% | 2.5 | — | — | 9.0 |
| Performance Data | | | | |
| Specific amount of flue gas or air m³/t based on dry flue gas gypsum | 5,000 | 5,000 | 5,600 | 11,500 |
| Operating Condition | | | | |
| Residence time sec | 2 | 2 | 120 | 2 |
| Flue Gas Gypsum Data | | | | |
| Feed moisture % | 9.0 | 9.0 | 9.0 | 10.0 |
| Residual moisture % | 0 | 0 | 0 | 0 |
| Water of crystallization before drying % | 20.7 | 20.7 | 20.7 | 18.8 |
| Water of crystallization after drying % | 20.7 | 20.7 | 8.5 | 18.8 |
| Energy Consumption | | | | |
| Type of thermal energy | Flue gas before FGD (1) | Hot Air | Hot air | Flue gas before FGD |
| Type of electrical energy | Booster blower FGD | Fan | Fan | Fan |
| Specific heat requirement by hot-air generator kcal/kgH₂O | Not applicable | 1,050 | 1,167 | Not applicable |
| Specific requirement of electrical energy for fan | Not applicable | 0.07 | 0.11 | 0.18 |

| | Column 1 Utilization of Flue Gas Heat and Booster Blower (Invention) | Column 2 External Energy (Comparison) | Column 3 Fluidized Bed Dryer (Comparison) | Column 4 Utilization of Flue Gas Heat (Invention) |
|---|---|---|---|---|
| kWh/kgH$_2$O | | | | |

(1) FGD = Flue Gas Desulfuration Plant

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of flue gas gypsum dihydrate from a furnace installation wherein a main flue gas stream is passed to a drying stage to dry gypsum dihydrate containing free water, by transferring flue gas stream heat thereto, passing the cooled flue gas stream containing gypsum dihydrate to a desulfuration stage and producing and separating gypsum dihydrate containing free water in the desulfuration, and passing the separated gypsum dihydrate containing free water to the drying stage to be dried therein, the improvement comprising the steps of:

dedusting the main flue gas stream obtained from the furnace installation;

separating a partial flue gas stream from the main flue gas stream in an amount of about 1–10% of the main flue gas stream; feeding a resultant stream of 90–99% of the main flue gas stream to a desulfuration stage for forming flue gas gypsum dihydrate containing free water, and separating flue gas gypsum dihydrate containing free water from the flue gas in the desulfuration stage; and simultaneously feeding the formed flue gas gypsum dihydrate containing free water from said desulfuration stage, and said partial flue gas stream to a drying stage to contact the flue gas gypsum dihydrate containing free water with the partial flue gas stream for drying the flue gas gypsum dihydrate under temperature and time conditions to form dried flue gas gypsum dihydrate consisting essentially of calcium sulfate dihydrate substantially free of hemihydrate and anhydrous calcium sulfate, and removing dried flue gas gypsum dihydrate having a particle size greater than about 20 micron from the drying stage, and recycling dry flue gas gypsum dihydrate having a particle size of less than about 20 micron along with the main flue gas stream and the partial cooled flue gas stream to the desulfuration stage.

2. A process according to claim 1, further comprising combining the partial stream of the flue gas, after the drying stage, with the primary stream of the flue gas prior to introduction of the primary stream into the desulfuration stage through a blower.

3. A process according to claim 1, wherein the partial stream of the flue gas is withdrawn from the inlet side of a blower connected upstream of the wet desulfuration stage and, after drying thereof, reintroducing the partial stream of the flue gas at the inlet side of the blower and recombining it at that location with the primary stream of the flue gas.

4. A process according to claim 1, further comprising conducting the partial stream of the flue gas, after separation of the dry flue gas gypsum, therefrom dihydrate in a conduit in indirect contact with the primary stream of the flue gas for raising the temperature thereof to about 100° to 130° C.

5. A process according to claim 1, wherein the free water content of the flue gas gypsum dihydrate prior to the drying stage comprises about 4–12% by weight.

6. A process according to claim 1 wherein the ratio of flue gas required for drying the flue gas gypsum dihydrate from the desulfuration comprises about 2,500 to 12,000 m$^3$ per ton of dry flue gas gypsum dihydrate.

7. A process according to claim 1, further comprising conducting said drying of the flue gas gypsum dihydrate under conditions such that the dried flue gas gypsum dihydrate contains a water of crystallization content of no more than about 20.9% by weight.

8. A process according to claim 1, wherein the partial gas stream separated is at a temperature of 130° C. and comprises about 2.5% of the main stream volume.

9. A process according to claim 5, wherein the free water content of the flue gas gypsum dihydrate before drying is about 9.0% by weight.

10. A process according to claim 1, wherein said dry gypsum dihydrate having a particle size of less than about 20 micron function as seed crystals and promote the production of larger gypsum dihydrate in the desulfuration stage.

11. A process according to claim 1 further comprising withdrawing the partial stream at a temperature of about 90°–130° C. at a point downstream from the dedusting stage and upstream from the desulfuration stage.

12. A process according to claim 1 further comprising conducting the drying of the gypsum dihydrate containing free water in a fluidized bed dryer under conditions to reduce the free water content of the gypsum dihydrate to about 0%, and separating the dried flue gas gypsum dihydrate from the flue gas in a cyclone separator.

13. A process according to claim 1 further comprising conducting the desulfuration according to the wet method with alkaline-acting calcium compounds.

14. A process according to claim 13, wherein said desulfuration is conducted with calcium carbonate.

* * * * *